W. E. SPARKS,

Assignor to P. & F. CORBIN.

Closet-Latch.

No. 8,644. Reissued April 1, 1879.

Witnesses.

A. B. Thomson

P. J. Markley

Inventor.

William E. Sparks

By James Shepard Atty

N. PETERS, PHOTO-LITHOGRAPHER, WASHINGTON, D. C.

UNITED STATES PATENT OFFICE.

WILLIAM E. SPARKS, OF NEW BRITAIN, CONNECTICUT, ASSIGNOR TO P. & F. CORBIN.

IMPROVEMENT IN CLOSET-LATCHES.

Specification forming part of Letters Patent No. 190,792, dated May 15, 1877; Reissue No. 8,644, dated April 1, 1879; application filed October 21, 1878.

*To all whom it may concern:*

Be it known that I, WILLIAM E. SPARKS, of New Britain, in the county of Hartford and State of Connecticut, have invented an Improvement in Closet-Catches, of which the following is a specification:

In Letters Patent No. 172,191 a closet-catch is shown in which the latch is provided with a stud, which passes through the plate, and receives beneath its undercut end the spring which projects the latch, and also serves to hold the latch to the plate.

My present invention is an improvement upon the aforesaid device, and is made for relieving the spring of strain or wear when the knob of the latch is pulled upon in opening the door.

I provide the latch-bolt with flanges, which are passed into position at the end of the guides and hook under or back of said guides, to retain the bolt in place when sliding out and in. The spring which projects the latch answers also as a stop to prevent the latch-bolt from moving so far as to release the flanges.

Figure 1:
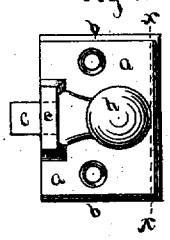
Figure 2:
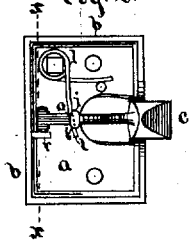
Figure 3:
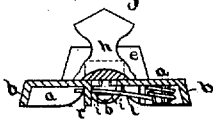

In the accompanying drawings, Figure 1 is a front elevation of a closet-catch which embodies my invention. Fig. 2 is a rear view of the same, and Fig. 3 is a vertical section at the line *x x* of Figs. 1 and 2.

The plate *a* is provided with a rim, *b*, and bridge *e*, and the latch *c* slides upon the outside of the plate *a* and beneath the bridge *e*, as in the aforesaid patent. The latch-knob *h* may be of any desired character.

The stud *o* projects from the back side of the latch, and has flanges *i i* at each side, projecting transversely to the length of the latch, which flanges constitute a part of the latch-bolt. The plate is slotted to receive the stud, the side walls of said slot forming longitudinal guides for the bolt to work in, and also, in connection with the flanges of the bolt, serve to prevent said bolt from being pulled forward out of the plate at any point of its ordinary movement. The inner ends of these guides—that is, the ends opposite the beveled end of the latch—are cut away or left open relatively to the flanges, so that the latter may be slipped backward into place at the end of the guides, and then moved inward endwise under the bridge *e*, and with the flanges hooking under, back of the guides, so as to retain the bolt in place independently of the spring during its ordinary movement, which constitutes the greater portion of its complete longitudinal throw; but it is evident that if the throw of said bolt is not limited or obstructed in some way, it would be liable to be thrown into that position in which the flanges and guides may disengage. I therefore make use of the spring *l* to limit the throw of the bolt, so that its ordinary movement when in use will not bring the flanges *i i* far enough inward to reach or rather pass the termination of the guides. One arm of this spring *l* rests against the bolt, and continually bears upon it to throw it outward; but when the bolt is forced inward against the spring and approaches the termination of the guides, it comes in contact with a stop, *r*, formed on the plate *a*, and blocks up or obstructs the passage of the bolt in that direction, so that the flanges cannot reach the point where they disengage from the plate.

I claim as my invention—

1. In a closet-catch, the bolt, substantially as described, in combination with the plate having guides for an integral part of said bolt, which terminate relatively thereto a little short of the complete unobstructed longitudinal movement of the bolt, substantially as described, and for the purpose specified.

2. The combination of the bolt, substantially as described, with the plate having guides for an integral part of said bolt during its ordinary movement, the stop against which the spring abuts, and the spring acting to force the bolt outward, and also to obstruct it from being moved inward to the point where the parts may be disengaged, substantially as described, and for the purpose specified.

WILLIAM E. SPARKS.

Witnesses:

CHARLES PECK,

E. L. PRIOR.